US009686769B2

United States Patent
Cheng et al.

(10) Patent No.: US 9,686,769 B2
(45) Date of Patent: Jun. 20, 2017

(54) SYSTEMS AND METHODS FOR USER EQUIPMENT MOBILITY PREDICTION (71) Applicant: Huawei Technologies Co., Ltd., Shenzhen (CN)

(72) Inventors: Ho Ting Cheng, Stittsville (CA); Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 718 days.

(21) Appl. No.: 13/839,830

(22) Filed: Mar. 15, 2013

(65) Prior Publication Data

US 2014/0171106 A1 Jun. 19, 2014

Related U.S. Application Data (60) Provisional application No. 61/737,602, filed on Dec. 14, 2012.

(51) Int. Cl.
*H04W 64/00* (2009.01)
*G01S 5/00* (2006.01)
*G01S 5/02* (2010.01)

(52) U.S. Cl.
CPC ......... *H04W 64/006* (2013.01); *G01S 5/0018* (2013.01); *G01S 5/021* (2013.01)

(58) Field of Classification Search
CPC . H04W 64/00; H04W 64/003; H04W 64/006; G01S 5/0018; G01S 5/021

(Continued)

(56) References Cited

U.S. PATENT DOCUMENTS 6,611,688 B1 * 8/2003 Raith .................. 455/456.1
2007/0049289 A1 * 3/2007 Woo .................. 455/456.1

(Continued)

FOREIGN PATENT DOCUMENTS

| CN | 101820677 A | 9/2010 |
| CN | 102547833 A | 7/2012 |

(Continued)

OTHER PUBLICATIONS

International Search Report and Written Opinion of the International Searching Authority received in Patent Cooperation Treaty Application No. PCT/CN2013/089503 mailed Mar. 20, 2014, 10 pages.

(Continued)

*Primary Examiner* — Marisol Figueroa
(74) *Attorney, Agent, or Firm* — Slater Matsil, LLP (57) ABSTRACT

System and method embodiments for mobility prediction in a wireless network enable the wireless network to determine the location of a wireless device with minimal transmissions from the wireless device. In an embodiment, the method includes negotiating with a mobile device to determine a mobility prediction algorithm and a condition upon which the mobile wireless device will report the actual location of the mobile device, training the mobility prediction algorithm using prior mobile wireless device location and timestamp information, determining a predicted location of the mobile device using the mobility prediction algorithm, and setting an predicted location for the mobile device at a time as the actual location for the mobile device at the time when failing to receive a location report from the mobile wireless device, wherein the mobile device transmits actual location information after the training period only if the condition is met.

28 Claims, 8 Drawing Sheets

(58) Field of Classification Search
USPC .............................................. 455/456.1–457
See application file for complete search history.

(56) References Cited

U.S. PATENT DOCUMENTS

| | | | |
|---|---|---|---|
| 2008/0114829 A1* | 5/2008 | Button et al. .................. | 709/203 |
| 2010/0246467 A1* | 9/2010 | Song et al. .................... | 370/312 |
| 2012/0184285 A1* | 7/2012 | Sampath et al. ............ | 455/456.1 |
| 2014/0062790 A1* | 3/2014 | Letz .................... | H04L 67/1095 |
| | | | 342/386 |
| 2014/0118113 A1* | 5/2014 | Kaushik et al. ............... | 340/8.1 |

FOREIGN PATENT DOCUMENTS

| | | | |
|---|---|---|---|
| GB | 2277844 | A | 5/1993 |
| WO | 0072619 | A1 | 11/2000 |
| WO | 2009019672 | A1 | 2/2009 |

OTHER PUBLICATIONS

Li, X. et al., "Mobility Prediction Based Neighborhood Discovery in Mobile Ad Hoc Networks," Networking' 11, Proceedings of the 10th International IFIP TC 6 conference on Networking—vol. Part I, 2011, 12 pages.

European Search Report of the European Patent Office received in Patent Cooperation Treaty Application No. 13863633.7-1812/ 2932774; PCT/CN2013089503, mailed Oct. 16, 2015, 7 pages.

\* cited by examiner

FIG. 9

SYSTEMS AND METHODS FOR USER EQUIPMENT MOBILITY PREDICTION

CROSS-REFERENCE TO RELATED APPLICATIONS

The present application claims the benefit of U.S. Provisional Patent Application No. 61/737,602 filed Dec. 14, 2012 by Ho-Ting Cheng, et al. and entitled "System and Method for User Equipment Mobility Prediction," which is incorporated herein by reference as if reproduced in its entirety.

TECHNICAL FIELD

The present invention relates to a system and method for wireless communications, and, in particular embodiments, to a system and method for user equipment mobility prediction.

BACKGROUND

The location of a mobile wireless device in a wireless network may be important for a variety of applications, such as providing maps and directions to users. The location may also be important in order to provide directions for emergency personal should the user of the mobile wireless device need assistance. Other applications, such as traffic reporting, weather reports, identity of nearby restaurants, stores, and cinemas may also depend on the location of the mobile wireless device. Different applications may have different requirements for the level of precision with which the mobile wireless device's location must be determined. A number of mechanisms have been developed for determining the actual location of a wireless device. However, these mechanisms often require the wireless device to report its location to the network frequently, thereby using up network resources.

SUMMARY OF THE INVENTION

In accordance with an embodiment, a method for mobility prediction in a wireless network includes negotiating with a mobile device to determine a mobility prediction policy to be implemented on both the mobile device and a mobility prediction server, receiving at least one actual location and timestamp from the mobile device during a training period according to the mobility prediction policy, and receiving actual location information from the mobile device after the training period only when specified by the mobility prediction policy.

In accordance with another embodiment, a network component configured for mobility prediction in a wireless network includes a processor and a computer readable storage medium storing programming for execution by the processor. The programming includes instructions to negotiate with a mobile device to determine a mobility prediction policy to be implemented on both the mobile device and a mobility prediction server, receive at least one actual location and timestamp from the mobile device during a training period according to the mobility prediction policy, and receive actual location information from the mobile device after the training period only when specified by the mobility prediction policy.

In accordance with another embodiment a method for user equipment (UE) mobility prediction in a wireless network includes negotiating with the UE to determine a mobility prediction protocol, wherein the mobility prediction protocol specifies a mobility predictor and parameters to be used by both the UE and a system, wherein the parameters specify a training period and data to be exchanged during the training period, and wherein the parameters specify a reporting condition for the UE to report actual location information to the system after expiration of the training period. The method also includes training the mobility predictor on the UE and the system with actual location information during the training period and receiving actual location information from the UE after the expiration of the training period when the reporting condition is satisfied.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In wireless networks, UE mobility is one of the challenging issues for effective resource management. Imagine a driver who requests a service with tight quality of service (QoS) constraints might be going into a long tunnel very soon, where there will be no signal coverage. With this knowledge, the system should generally not admit this service as the system will not be able to provide enough capacity to satisfy the QoS requirements of this service. Besides service admission, mobility management is also used for other resource allocation domains such as flow control, routing, packet scheduling, etc. An embodiment provides a mobility management solution for service admission. The embodiment methodology can be applied to other resource allocation areas such as routing, flow control, etc.

In an embodiment, the UE and the system exchange messages with each other to negotiate a mobility prediction protocol. The mobility prediction protocol specifies a mobility predictor to be used by both the UE and the system in parallel with each other. The mobility prediction protocol also specifies the parameters that the UE will provide to the system (e.g., a location and time stamps for a specified number of previous locations for the UE) for training the mobility predictor. The locations and timestamps are used by the UE and the system to train the mobility predictor so that both the UE and the system predict the same location for a given time. The mobility prediction protocol also specifies the condition(s) upon which the UE will report its actual location to the system. After the training period, the UE only reports its actual location to the system if the condition(s) for reporting are satisfied. Otherwise, the UE will refrain from transmitting actual location information and the system assumes that its predicted location for the UE is the actual location for the UE. In an embodiment, the mobile location may be defined as an absolute location (e.g., geographic location—longitude and latitude), a location relative to the network infrastructure (e.g., received radio signal strength from network radio nodes, pathloss, average signal to noise ratio (SNR), etc.), or location relative to one or more nearby landscape references (e.g., buildings, constructions, bridges, roads, parks, recreation areas, etc.). In an embodiment, whenever the UE reports to the system, the mobile report content may include any type of location as defined above, current and/or historical locations of the mobile device, information on a route plan (if available, such as a GPS plan), and predictor-specific data associated with location information. The location reported to the system may be as a change in reference to a previous report (e.g., 10 meters north of last location).

An embodiment provides a simple system to enable online mobility prediction where the UE only reports location information when needed (e.g., an estimation error exceeds a certain threshold, a change in direction of the UE from a previous direction of travel exceeds a threshold, a change in the speed of travel of the UE exceeds a threshold, the conditions through which the UE is about to travel through or have travelled through require an update (e.g., the UE is about to enter a tunnel or has exited a tunnel), etc.). The system also enables fast adaptation to any changes on the fly. Resources can be better allocated with more accurate UE mobility. Admission control could admit more users given the accurate mobility patterns of already admitted UEs. Handover performance and hence quality of experience (QoE) can be improved. Routing can select a better route with accurate mobility information. It can be combined with other historical statistics for better mobility prediction. Knowing UE locations accurately can help result in better resource utilization to improve service admission performance, handover/routing performance, etc.

An embodiment estimates the location of the UE at any given time. Time is divided into a training phase and a prediction phase. In the training phase, the UE reports its location information with timestamps to the system. Both the UE and the system run the same algorithm to train a mobility predictor.

In an embodiment, the prediction scheme is an on-demand per user or per application customized mobility prediction scheme. The predictor algorithm, the report content, and the report period can be negotiated on a per user basis, per session bases, per application basis, or based on one or more of UE equipment capability/battery, application quality of service (QoS), and network topology (denser deployment or not, etc.)

In the prediction phase, both the UE and the network run the same type of predictor or algorithm. The UE reports its current and past actual location information if a condition is met. The condition may be an event driven occurrence (e.g., the estimated location and the actual location is off more than the threshold) or periodically, as agreed. For example, if the estimated location and the actual location are within a threshold, the UE does not report to the system and the system assumes the estimated location is accurate. If the estimated location and the actual location are off more than the threshold, the UE reports its current location information (and previous location information) with timestamps to the system. Both the UE and the system correct the errors in parallel.

An embodiment protocol enables policy-based UE location estimation and prediction having two phases, a mobility prediction policy negotiation, and a UE location estimation and prediction. In the mobility prediction policy negotiation phase, the system and the UE negotiate a mobility prediction policy, which includes a mobility prediction algorithm, parameters for the mobility prediction algorithm, and a mobility prediction correction mechanism. In the UE location estimation and prediction phase, both the UE and the system, first train the same mobility predictor according to the negotiated policy. Second, they estimate and predict the UE locations, and correct the mobility predictor based on the policy. This protocol also allows dynamic mobility prediction policy negotiations between the UE and the system on the fly.

In an embodiment, the mobility protocol also includes an error correction phase. If the condition for reporting actual location is met, the UE transmits location and timestamp data for a plurality of previous locations and times to retrain (e.g., correct location errors) the mobility predictor on both the system and the UE. After the mobility predictor on both the UE and the system have been retrained, the UE and the system re-enter the prediction phase in which the UE does not report actual location information unless the condition for reporting is met. Some radio reception information from the detection of the radio signal carrying the report information from the UE could be used for the purpose of correcting the measurement accuracy of the mobile device location.

In an embodiment, the UE and the system renegotiate the mobility predictor and parameters. The condition for renegotiating a new mobility predictor and parameters be specified in the original agreed upon mobility predictor and parameters or be initiated by either the UE or the system. For example, if network conditions change, the system initiates a new negotiation with the UE. For example, if network conditions have improved, the UE and the system agree on new reporting conditions that may occur more frequently thereby making use of the improved network conditions. Alternatively, if the network conditions have denigrated, the system and the UE may agree on reporting conditions that are less likely to occur and thereby place fewer demands on the network.

In an embodiment, the UE requests to renegotiate the mobility predictor and parameters due to changes in the state of the UE (e.g., battery status, computational power, etc.). For example, if the UE's battery is low, the UE may negotiate a condition for reporting that may occur less frequently (e.g., by specifying a larger difference between the actual and predicted location before reporting) so as to conserve battery resources. If other applications on the UE are making greater demands on the computational power of the UE, the UE may wish to negotiate a new mobility predictor that is less computationally intensive than the one currently running.

In an embodiment, mobility prediction policy negotiation includes messages that are exchanged to determine which mobility predictor to use, which parameters are used, and under what conditions a UE should report.

A location information request is sent from the system to a UE. In the training period, a UE reports a number of location information samples to the system so that both the system and the UE can have the same trained mobility predictor.

Samples of location information are sent from a UE to the system. In the prediction phase, a UE sends a number of actual location information samples or elements from which can be deduced the actual location information samples (e.g., pathloss) to the system so that both the UE and the system can correct the mobility predictor in exactly the same manner.

Figure 1:
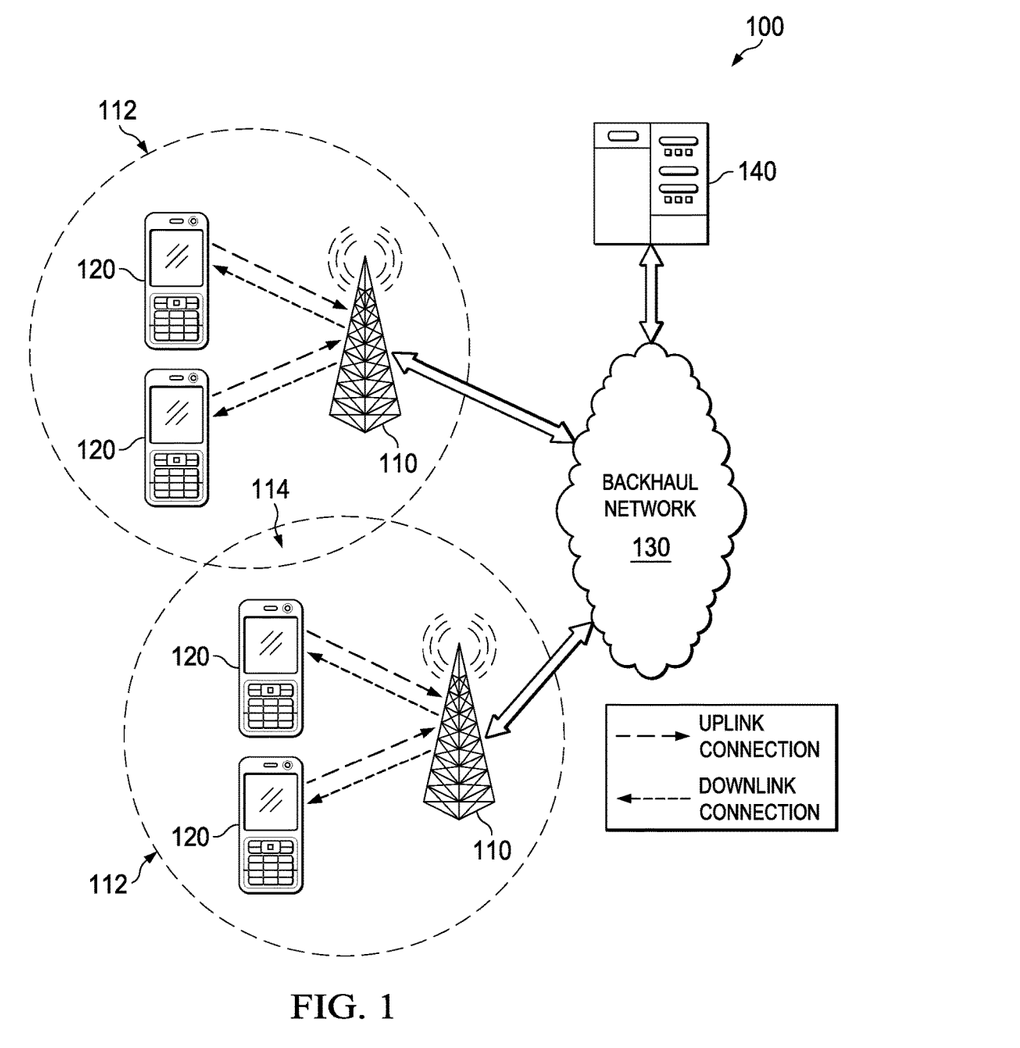
FIG. 1 illustrates a network for communicating data.

FIG. 1 illustrates a network 100 for communicating data. The network 100 comprises a plurality of access points (APs) 110 each having a coverage area 112, a plurality of user equipment (UEs) 120, a backhaul network 130, and a mobility computation system 140. As used herein, the term AP may also be referred to as a transmission point (TP), a base station (BS), or a base transceiver station (BTS), and the terms may be used interchangeably throughout this disclosure. These coverage areas represent the range of each AP 110 to adequately transmit data, and the coverage areas of adjacent APs 110 may have some overlap 114 in order to accommodate handoffs between APs 110 whenever a UE 120 exits one coverage area 112 and enters an adjacent coverage area 112. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. For example, the a UE 120 may be a smartphone, a laptop computer, a tablet computer, a wireless telephone, etc. The UEs 120 may also be referred to as wireless devices, mobile devices, or wireless mobile devices. The backhaul network 130 may be any component or collection of components that allow data to be exchanged between the AP 110 and a remote end (not shown). In some embodiments, the network 100 may comprise various other wireless devices, such as relays, femtocells, etc.

The mobility computation system 140 negotiates with UEs 120 to establish a common mobility prediction algorithm, parameters for determining the location, and parameters for determining when the UE should report its location. The common mobility prediction algorithm is to be used by the respective UE 120 and the mobility computation system 140 in determining the location of the UE. The UE 120 and the mobility computation system 140 enter a training phase to allow the mobility prediction algorithm to have sufficient data points to determine a predicted UE 120 location. After the training phase, the UE 120 does not report its location except when a condition or criteria negotiated by the UE 120 and the mobility computation system 140 has been met.

Figure 2:
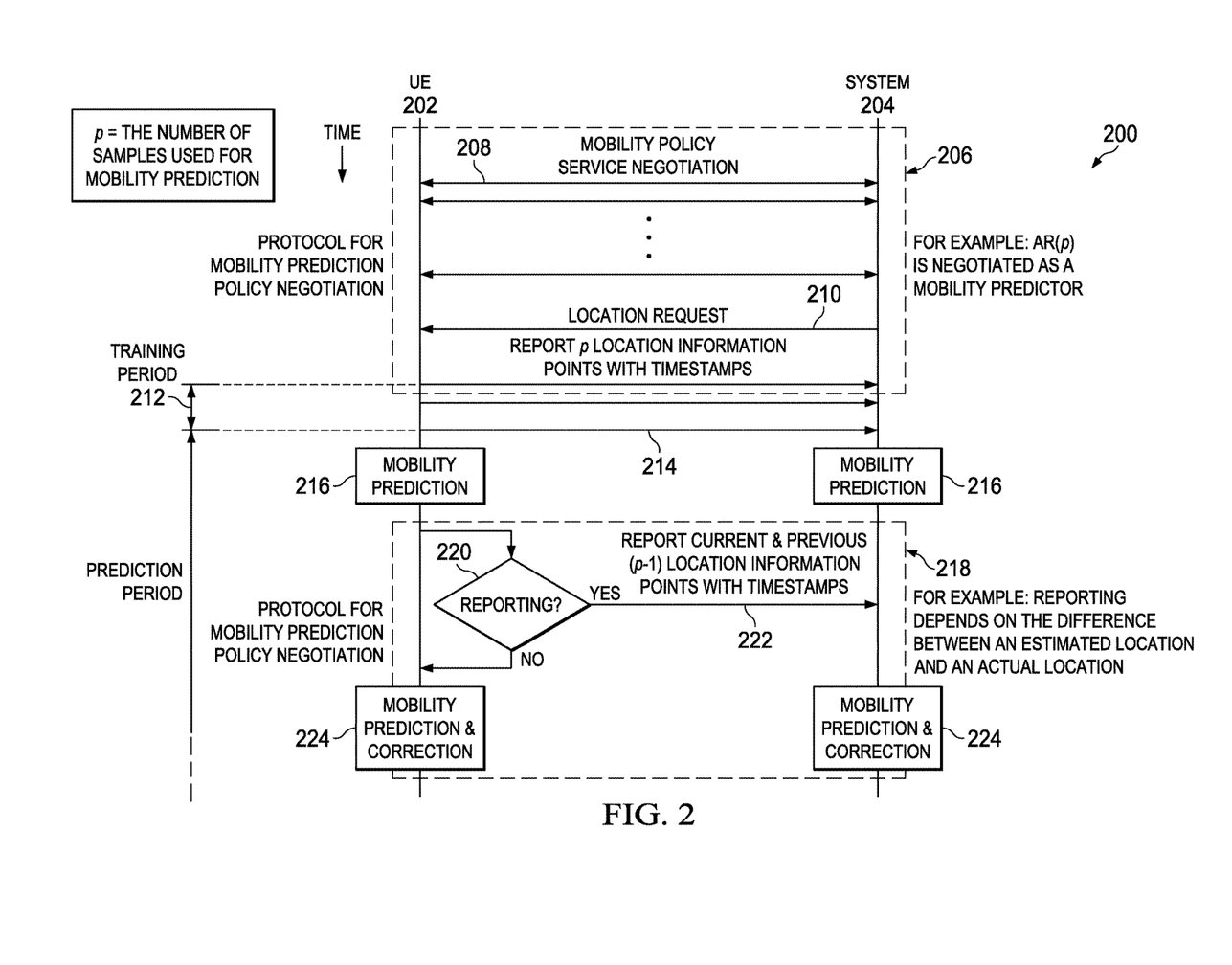
FIG. 2 illustrates a protocol diagram for an embodiment of a system for mobility prediction policy negotiation and location estimation.

FIG. 2 illustrates a timing diagram for a protocol 200 for mobility prediction policy negotiation and location estimation. The protocol 200 may include a UE 202 exchanging messages with a system 204. UE 200 may be substantially similar to UE 120 in FIG. 1. System 204 may be substantially similar to the mobility computation system 140 depicted in FIG. 1. Initially, the UE 202 and the system 204 enter a negotiation phase 206 in which the UE 202 and the system 204 exchange mobility policy service negotiation messages 208 to agree on a location prediction algorithm, number of location information points to provide for a training period 212, and the criteria or conditions for the UE 202 to report actual location information to the system 204 after the UE 202 and the system 204 have entered a prediction period. After the UE 202 and the system 204 have agreed upon the prediction algorithm and other information, the system 204 sends the UE 202 a location request 210 to which the UE reports with one or more messages 214 providing location information points and timestamps to the system 204 during a training period 212.

Once the training period 212 has expired, both the UE 202 and the system 204 run the same mobility prediction algorithm 216 during the prediction period 218. The UE 202 periodically or occasionally determines whether a reporting 220 condition has been met indicating that the UE 202 should report its actual location and timestamp information to the system 204. If the condition has not been met, then the UE 202 does not transmit actual location and timestamp information to the system 204 and the system 204 assumes that the predicted location from the mobility prediction algorithm 216 is the actual location of the UE 202. If the condition for reporting 220 has been met, then the UE 220 sends one or more messages 222 to the system 204 reporting its current location and timestamp information as well as possibly a pre-specified number of previous location and timestamp points. Both the UE 202 and the system 204 then enter a mobility prediction and correction phase 224 to update the prediction algorithm, after which, both the UE 202 and the system 224 re-enter the prediction period in which the UE 202 only reports its actual location to the system 204 if the reporting condition 220 is met. Otherwise, the system 224 assumes that the predicted location is the actual location. In an embodiment, the reporting condition is that the UE 202 determines that the predicted location and the actual location exceed a predefined maximum variation.

Figure 3:
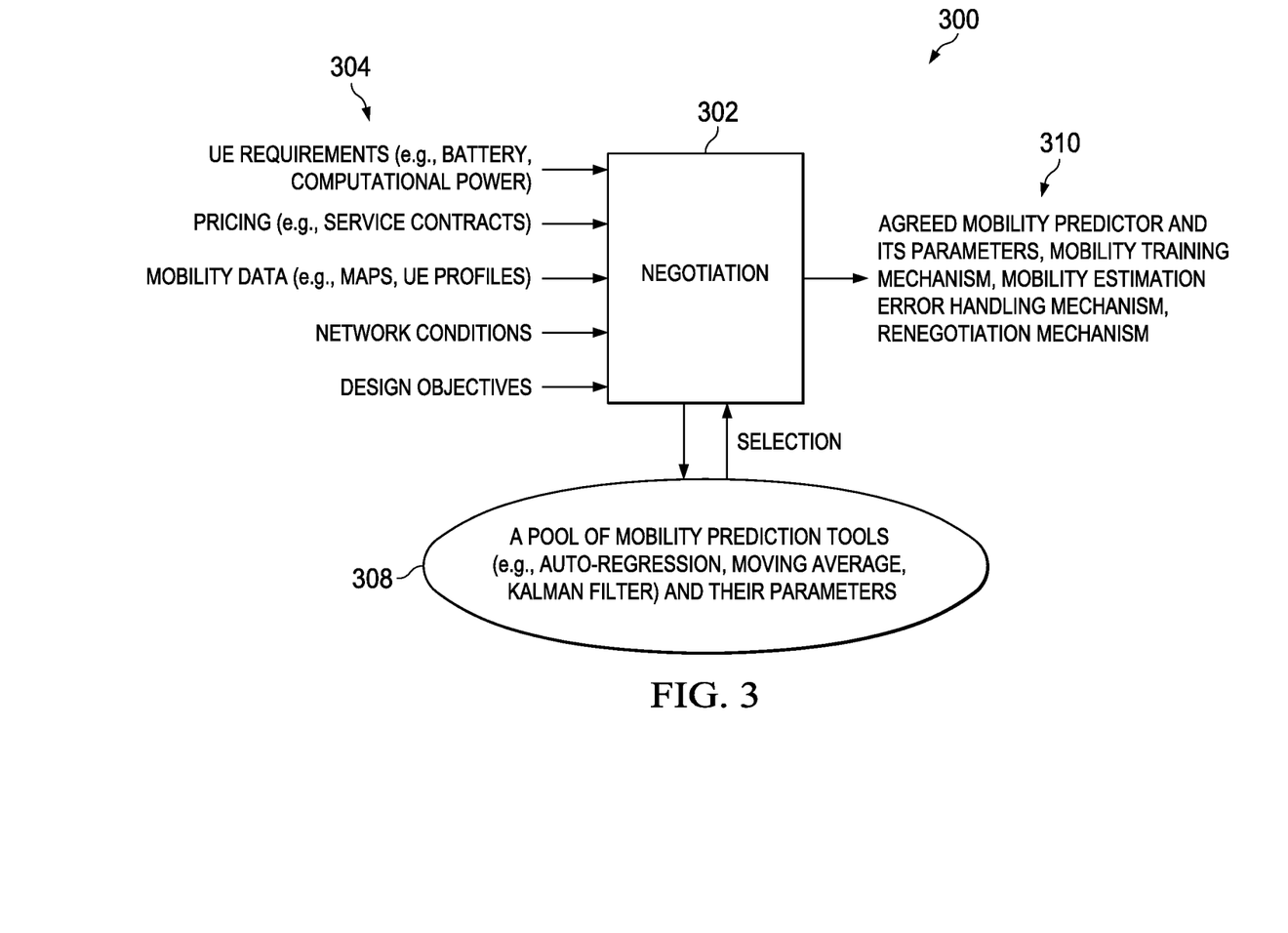
FIG. 3 illustrates an embodiment system for providing online UE mobility prediction.

FIG. 3 illustrates an embodiment system 300 for providing online UE mobility prediction. The system 300 includes a pool 308 of mobility prediction tools and their parameter sets to choose from. Both the mobility computation system and the UE negotiate 302 based on a number of factors 304.

The first factor 304 includes the UE requirements, such as the battery condition of a UE device, the computational capability of the device, the reliability of its GPS, etc. The second factor 304 includes pricing information. Suppose UE mobility prediction becomes a mandatory function for any services. How mobility prediction is performed depends on the pricing information. For example, a UE may pay more for the same service if he reports its location information less frequent than the others. The third factor 304 includes mobility data. Location databases are readily available and points of interest such as roadway conditions can be used for the mobility predictor (and its parameter) selection. For example, driving on a highway would generally require less location samples for prediction compared to driving in a city. The fourth factor 304 includes network conditions. A UE located near a cell edge might require more power to report its location information. Or, if a cell is overloaded, requiring every UE in its cell to report their locations frequently might not be feasible. The fifth factor 304 includes design objectives. The objectives of mobility prediction may also be part of a negotiation process. The objectives may include message reduction, neighbor discovering, power consumption reduction, cost reduction, etc.

The two parties then agree 310 to use the same mobility predictor selected from the pool 308, what parameters of this mobility predictor are used, what a mobility predictor training mechanism would be, how mobility estimation error is handled, and/or how re-negotiation is triggered.

As an example, for mobility prediction, a simplified autoregressive AR(p) model is be used. However, other mobility prediction algorithms may also be used. The AR(p) model is given as follows (ignoring a random noise term):

$$\tilde{z}_k = c + \sum_{i=1}^{p} \phi_i z_{k-i}$$

where p is the order of the AR model, $z_j$ is the actual $j^{th}$ observation, $\tilde{z}_k$ is the estimated $k^{th}$ observation, $\emptyset_i$ is the $i^{th}$ coefficient of the AR model, and c is a constant.

The estimation error is denoted as $e_k = z_k - \tilde{z}_k$. A mobility predictor may be built as follows:

Initialize all the AR coefficients:

$$\phi_j = \frac{w_j}{p}, \text{ for } j = 1, 2, \ldots, p,$$

where $\sum_{i=1}^{p} \phi_i = 1$ and $w_j \geq 0$, for $j = 1, 2, \ldots, p$.

Notice that these weights $w_j$'s can be obtained through online or offline training.

Update the coefficients starting from j=1 to j=p:

$$\tilde{\phi}_j = \frac{1}{z_{k-j}} \left( z_k - \frac{je_k}{p+1} - \sum_{i=1}^{j-1} \tilde{\phi}_i z_{k-i} - \sum_{i=j+1}^{p} \phi_i z_{k-i} \right)$$

Update the constant c:

$$c = z_k - \sum_{i=1}^{p} \tilde{\phi}_i z_{k-i}$$

Use this predictor to predict the speed and the direction of a UE. Given two sets of xy-coordinates, the speed and direction can be computed as follows. Denote $\theta_i$ as the direction, $s_i$ is the speed at time slot I, and T is the duration spent travelling. Thus, $$\theta_i = \begin{cases} \arctan\left(\frac{y_i - y_{i-1}}{x_i - x_{i-1}}\right) & \text{if } x_i > x_{i-1} \\ \arctan\left(\frac{y_i - y_{i-1}}{x_i - x_{i-1}}\right) + \pi & \text{if } x_i < x_{i-1} \\ \frac{1}{2}\pi & \text{if } x_i = x_{i-1} \& y_i > y_{i-1} \\ -\frac{1}{2}\pi & \text{if } x_i = x_{i-1} \& y_i \leq y_{i-1} \end{cases}$$

$$s_i = \sqrt{(x_i - x_{i-1})^2 + (y_i - y_{i-1})^2}$$

Both the direction and the speed at time slot i+1, $\tilde{\theta}_{i+1}$ and $\tilde{s}_{i+1}$, respectively, can be estimated using the proposed AR model. A standard continuous transformation on the direction is applied. With the estimates, the xy-coordinates can be predicted as follows:

$$\tilde{x}_{i+1} = x_i + \tilde{s}_{i+1} \cos(\tilde{\theta}_{i+1})$$

$$\tilde{y}_{i+1} = y_i + \tilde{s}_{i+1} \sin(\tilde{\theta}_{i+1})$$

The system may alter the predictor, for example by increasing the number of samples needed for the predictor on the fly.

Figure 4:
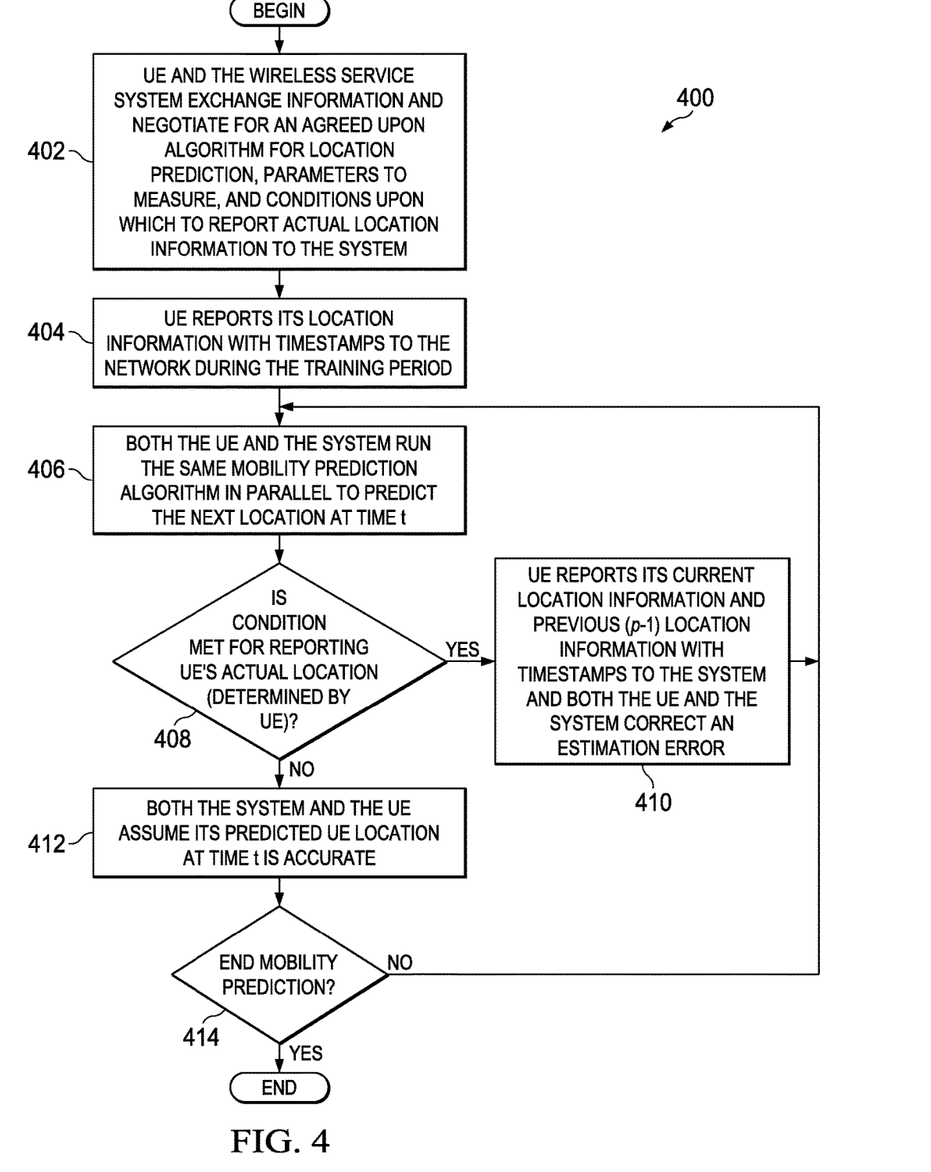
FIG. 4 illustrates a flowchart of an embodiment of a method for negotiating a mobility prediction algorithm and implementing mobility prediction.

FIG. 4 illustrates a flowchart of an embodiment of a method 400 for negotiating a mobility prediction algorithm and implementing mobility prediction. The method 400 begins at block 402 where the UE and the wireless service system exchange information and negotiate and agree upon algorithm for location prediction, parameters to measure, and conditions upon which the UE should report actual location information the system. At block 404, the UE reports its location information with timestamps to the mobility prediction system during a training period in order that the mobility prediction system has sufficient information to predict the UEs location at a given time. At block 406, both the UE and the system run the same mobility prediction algorithm (to which they both agreed during the negotiation phase) in parallel to predict the next location of the UE at time t. At block 408, the UE determines whether the condition has been met for reporting the UE's actual location. If yes, then the method 400 proceeds to block 410 where the UE reports its current location information and possibly a number of previous location information with timestamps to the mobility prediction system and both the UE and the system correct an estimation error, after which, the method proceeds to block 406. If, at block 408, the condition is not met, then the method 400 proceeds to block 412 where both the system and the UE assume that its predicted UE location at time t is correct. The method 400 then proceeds to block 414 where it is determined whether to end mobility prediction (e.g., the UE is powered off). If mobility prediction is continued at block 414, then the method proceeds to block 406. Otherwise, the method 400 ends.

Figure 5:
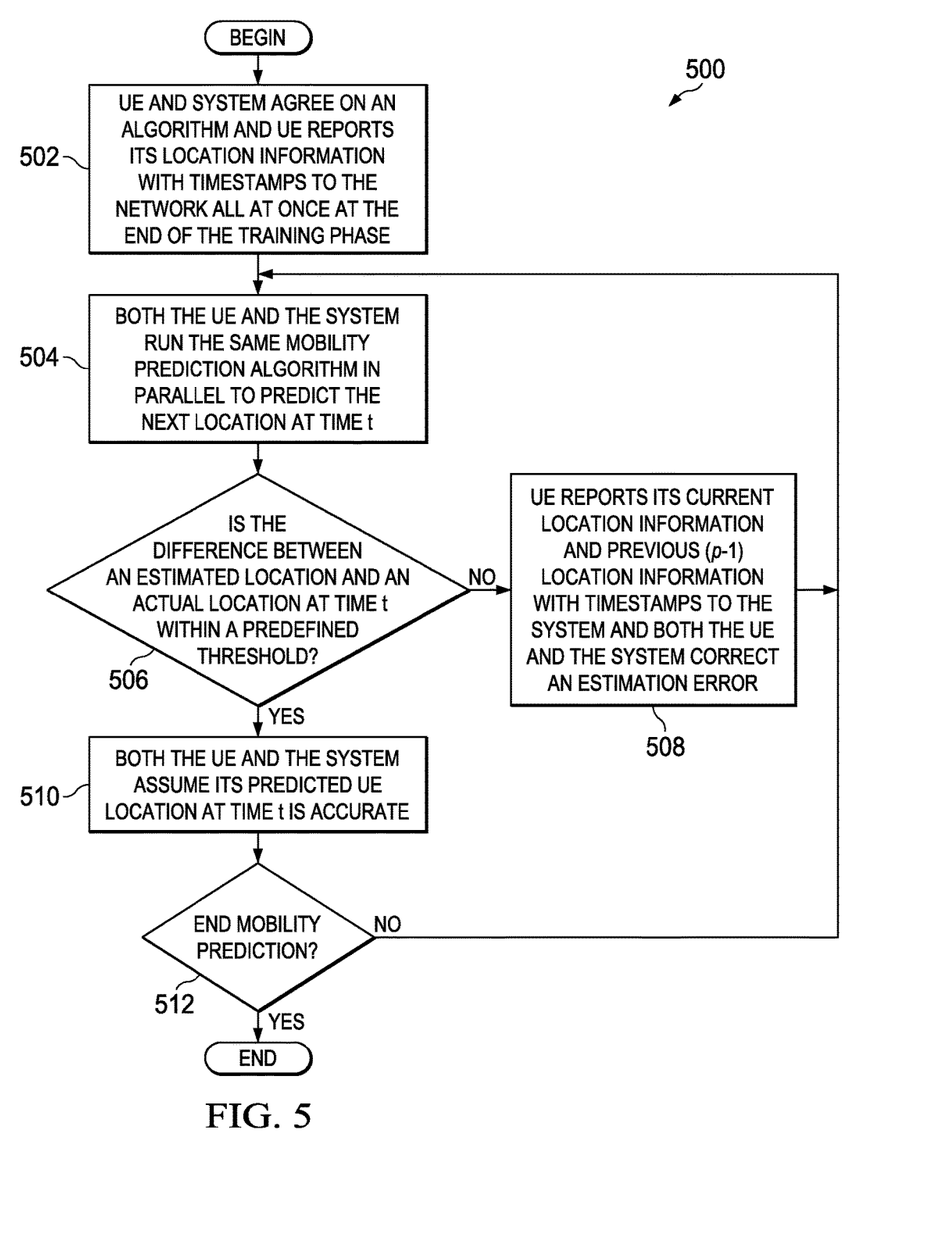
FIG. 5 illustrates a flowchart of another embodiment of a method for negotiating a mobility prediction algorithm and implementing mobility prediction.

FIG. 5 illustrates a flowchart of another embodiment of a method 500 for negotiating a mobility prediction algorithm and implementing mobility prediction. The method 500 begins at block 502 where the UE and the mobility prediction system agree on a mobility prediction algorithm and the UE reports its location information with timestamps to the mobility prediction system all at once at the end of the training phase. At block 504, both the UE and the mobility prediction system runs the same mobility prediction algorithm in parallel to predict the next location of the UE at time t. At block 506, the UE determines whether the difference between an estimated location and an actual location at time t is within (i.e., less than) a predefined threshold (e.g., within 10 meters). If, at block 506, the difference is greater than the predefined threshold, then the method 500 proceeds to block 508 where the UE reports its current location information and possibly the previous (p−1) location information (so that the mobility prediction system has sufficient information to perform the agreed upon mobility prediction algorithm) with timestamps to the mobility prediction system and both the UE and the mobility prediction system correct an estimation error, after which the method 500 proceeds to block 504. If, at block 506, the difference is less than the predefined threshold, then the method 500 proceeds to block 510 where both the UE and the system assume that its predicted UE location at time t is accurate. The method 500 then proceeds to block 512 and determine whether to end mobility prediction (e.g., the UE is powering down). If, at block 512, mobility prediction is not ended, then the method 500 proceeds to block 504. If, at block 512, the mobility prediction is ended, then the method 500 ends.

Figure 6:
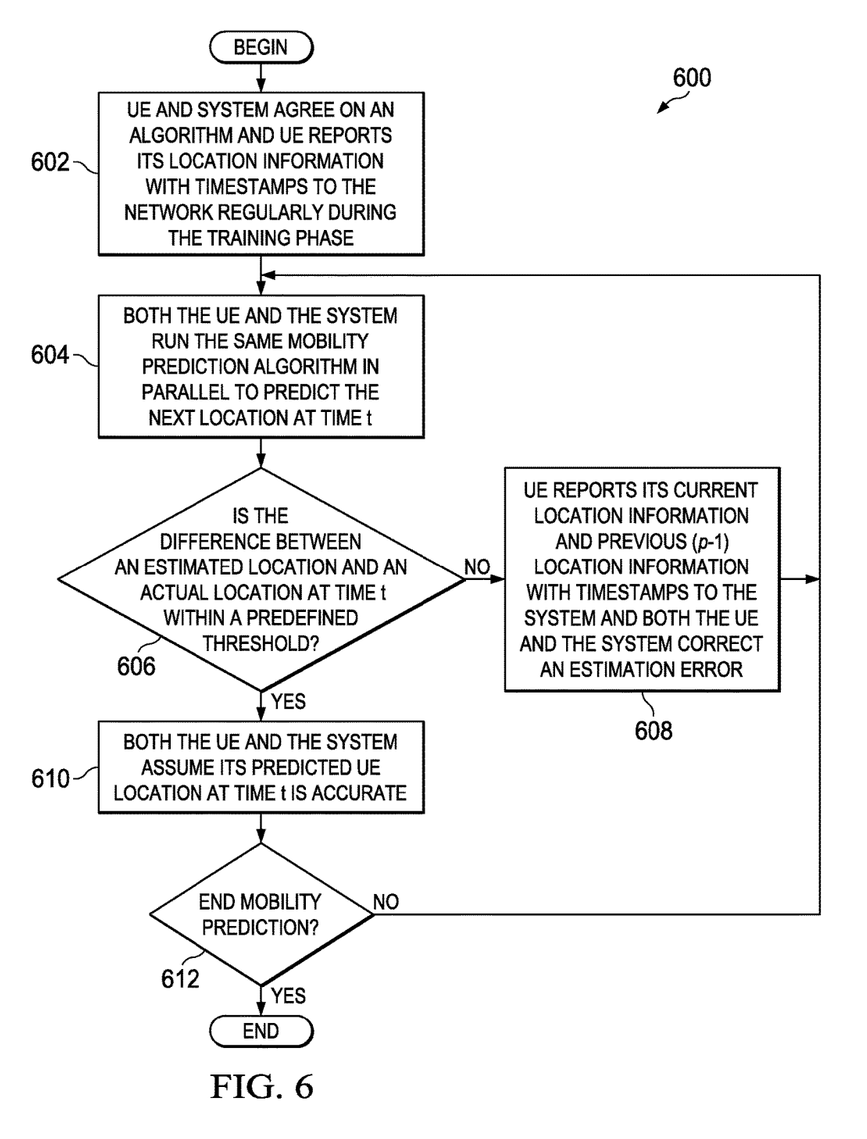
FIG. 6 illustrates a flowchart of another embodiment of a method for negotiating a mobility prediction algorithm and implementing mobility prediction.

FIG. 6 illustrates a flowchart of another embodiment of a method 600 for negotiating a mobility prediction algorithm and implementing mobility prediction. The method 600 begins at block 602 where the UE and the mobility prediction system agree on an algorithm and the UE reports its location information with timestamps to the network mobility prediction system regularly (e.g., at periodic intervals) during the training phase rather than all at once as shown in FIG. 5. The remainder of method 600 (i.e., blocks 604, 606, 608, 610, and 612) are substantially similar to their corresponding blocks in method 500 (i.e., blocks 504, 506, 508, 510, and 512).

Figure 7:
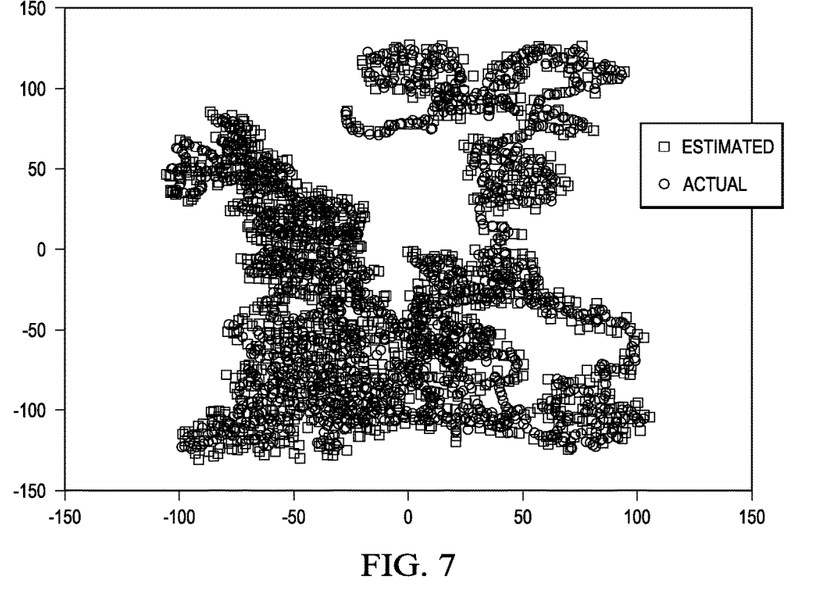
FIG. 7 is a chart illustrating a comparison of the actual path (lighter shading) and the estimated path (darker shading) for a UE during a performance test.

FIG. 7 is a chart 700 illustrating a comparison of the actual path (lighter shading) and the estimated path (darker shading) for a UE during a performance test. The performance was evaluated with an AR mobility predictor as described above. The simulation parameters included:
Topology: 250 m×250 m
Simulation time: 20,000 seconds
UE mobility model: random waypoint
  Speed: uniform on (0.2, 2.2) m/s
  Pause: uniform on (0, 1) s
  Walk: uniform on (2, 6) s
  Direction: uniform on (−180, 180) degrees
Simplified AR(5)
UE reports if the distance between an estimated location and an actual location is more than 5 meters.

Chart 700 shows a comparison of the actual path (indicated with circles and lighter shading) and the estimated path (indicated with triangles and darker shading). From the chart 700, it can be seen that the predicted path is close to the actual path.

Figure 8:
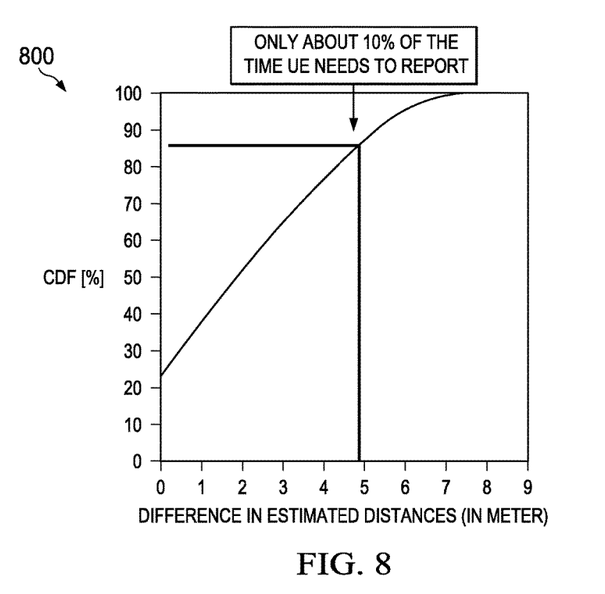
FIG. 8 illustrates a graph of the difference in actual location compared to estimated location for a performance test versus a cumulative distribution function (CDF)

FIG. 8 illustrates a graph 800 of different in actual location compared to estimated location for the simulation described in above versus a cumulative distribution function (CDF). From graph 800, the amount of overhead incurred to enable the disclosed mobility prediction can be obtained. The threshold was set to 5 meters and in only about 10% of the time does a UE need to perform the location information reporting, thereby reducing the overhead on the wireless network.

Figure 9:
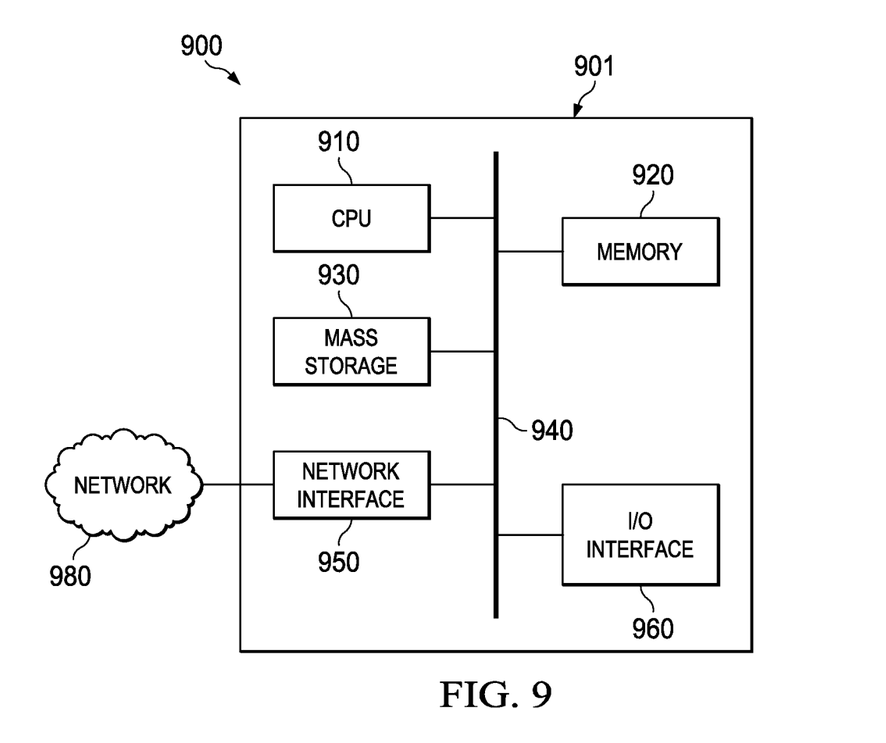
FIG. 9 is a processing system that can be used to implement various embodiments.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 comprises a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, and an I/O interface 960 connected to a bus 940.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901, and additional or fewer interface cards may be utilized. For example, a serial interface such as Universal Serial Bus (USB) (not shown) may be used to provide an interface for a printer.

The processing unit 901 may also include one or more network interfaces 950, which may comprise wired links, such as an Ethernet cable or the like, and/or wireless links to access nodes or different networks. The network interface 901 allows the processing unit to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for mobility prediction in a wireless network, the method comprising:
   negotiating with a mobile device to determine a mobility prediction policy to be implemented on both the mobile device and a mobility prediction server, the mobility prediction policy specifying a mobility predictor to be used by both the mobile device and the mobility prediction server;
   negotiating with the mobile device to determine training parameters that the mobile device will provide to the mobility prediction server for training the mobility predictor on the mobility prediction server;
   receiving at least one actual location and timestamp from the mobile device during a training period according to the mobility prediction policy; and receiving actual location information from the mobile device after the training period only when specified by the mobility prediction policy.

2. The method of claim 1, wherein the mobility prediction policy specifies at least one condition for which the mobile device will transmit an actual location after an expiration of the training period.

3. The method of claim 2, wherein the at least one condition comprises determining whether a difference between the actual location of the mobile device from a predicted location of the mobile device exceeds a threshold value.

4. The method of claim 2, wherein the at least one condition comprises determining whether a change in at least one of a direction and a speed of the mobile device exceeds a threshold value.

5. The method of claim 2, wherein the at least one condition comprises at least one of an event trigger and a reporting period.

6. The method of claim 1, further comprising determining a predicted location of the mobile device using the mobility prediction policy.

7. The method of claim 6, further comprising setting a predicted location for the mobile device at a time as the actual location for the mobile device at the time when failing to receive a location report from the mobile device.

8. The method of claim 6, further comprising correcting an error in the predicted location after receiving actual location information from the mobile device after an end of the training period.

9. The method of claim 1, wherein the location comprises as an absolute geographic location.

10. The method of claim 1, wherein the location comprises a relative location, wherein the location is described relative to one of network infrastructure and a nearby landscape reference.

11. The method of claim 10, wherein the relative location is determined relative to one of a received radio signal strength from network radio nodes, pathloss, and an average signal to noise ratio.

12. The method of claim 1, wherein the actual location information comprises at least one of an absolute location, a location relative to network infrastructure, a location relative to a landscape feature, current location, a historical location, information on a route plan, predictor specific data associated with the location, and location information relative to a previous location.

13. The method of claim 1, wherein the negotiation comprises an on-demand negotiation per user or per application of a customized mobility prediction scheme.

14. The method of claim 1, wherein the mobility prediction policy is based on at least one of user equipment capability, user equipment battery type, application quality of service, and network topology.

15. The method of claim 1, wherein radio reception information from a detection of a radio signal carrying the actual location information from the mobile device received after the training period is used to correct measurement accuracy of the location of the mobile device.

16. A network component configured for mobility prediction in a wireless network, comprising:
a processor; and
a computer readable storage medium storing programming for execution by the processor, the programming including instructions to:
negotiate with a mobile device to determine a mobility prediction policy to be implemented on both the mobile device and a mobility prediction server, the mobility prediction policy specifying a mobility predictor to be used by both the mobile device and the mobility prediction server;
negotiate with the mobile device to determine training parameters that the mobile device will provide to the mobility prediction server for training the mobility predictor on the mobility prediction server;
receive at least one actual location and timestamp from the mobile device during a training period according to the mobility prediction policy; and
receive actual location information from the mobile device after the training period only when specified by the mobility prediction policy.

17. The network component of claim 16 wherein the mobility prediction policy specifies at least one condition for which the mobile device will transmit an actual location after an expiration of the training period.

18. The network component of claim 17 wherein the at least one condition comprises determining whether a difference between the actual location of the mobile device from an predicted location of the mobile device exceeds a threshold value.

19. The network component of claim 17 wherein the at least one condition comprises determining whether a change in at least one of a direction and a speed of the mobile device exceeds a threshold value.

20. The network component of claim 16, wherein the processor is further configured to determine a predicted location of the mobile device using the mobility prediction policy.

21. The network component of claim 20, wherein the processor is further configured to set the predicted location for the mobile device at a time as the actual location for the mobile device at the time when failing to receive a location report from the mobile device.

22. The network component of claim 20, wherein the processor is further configured to correct an error in the predicted location when receiving actual location information from the mobile device after an end of the training period.

23. A method for user equipment (UE) mobility prediction in a wireless network, the method comprising:
negotiating with the UE to determine a mobility prediction protocol, wherein the mobility prediction protocol specifies a mobility predictor and parameters to be used by both the UE and a system, wherein the parameters specify a training period and data to be exchanged during the training period, and wherein the parameters specify a reporting condition for the UE to report actual location information to the system after expiration of the training period;
negotiating with the to determine the training parameters that the mobile device will provide to the mobility prediction server for training the mobility predictor on the mobility prediction server;
training the mobility predictor on the UE and the system with actual location information during the training period; and
receiving actual location information from the UE after the expiration of the training period when the reporting condition is satisfied.

24. The method of claim 23, using a predicted UE location as an actual UE location.

25. The method of claim 24, wherein the reporting condition comprises a change to at least one of network conditions and a status of the UE.

26. The method of claim 23, further comprising renegotiating the mobility prediction protocol in response to a changed condition.

27. The method of claim 23, wherein the mobility prediction protocol is negotiated based on at least one of UE requirements, pricing, mobility data, network conditions, and design objectives.

28. The method of claim 27, wherein the UE requirements comprise at least one of battery status and computational power.

* * * * *